(12) United States Patent
Burg et al.

(10) Patent No.: US 7,822,184 B2
(45) Date of Patent: **\*Oct. 26, 2010**

(54) CALL HOLD SIGNALING

(75) Inventors: Frederick Murray Burg, West Long Branch, NJ (US); Mark Jeffrey Foladare, East Brunswick, NJ (US); Tung-Hai Hsiao, Holmdel, NJ (US)

(73) Assignee: AT&T Intellectual Property II, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/430,660

(22) Filed: Apr. 27, 2009

(65) Prior Publication Data

US 2009/0207992 A1 Aug. 20, 2009

Related U.S. Application Data

(63) Continuation of application No. 11/781,643, filed on Jul. 23, 2007, now Pat. No. 7,526,077, which is a continuation of application No. 11/184,126, filed on Jul. 19, 2005, now Pat. No. 7,248,683, which is a continuation of application No. 10/078,685, filed on Feb. 19, 2002, now Pat. No. 6,925,161.

(51) Int. Cl.
*H04M 3/428* (2006.01)
*H04L 12/66* (2006.01)

(52) U.S. Cl. ............ 379/201.01; 370/352; 379/207.02; 379/215.01; 379/900

(58) Field of Classification Search ............... 370/352; 379/201.01, 201.02, 207.02, 215.01, 393, 379/900

See application file for complete search history.

(56) References Cited

U.S. PATENT DOCUMENTS

| | | | |
|---|---|---|---|
| 5,444,774 A | 8/1995 | Friedes | |
| 5,825,867 A | 10/1998 | Epler et al. | |
| 5,920,616 A | 7/1999 | Hazenfield | |
| 5,946,378 A | 8/1999 | Farfan | |
| 6,014,439 A | 1/2000 | Jorasch et al. | |
| 6,208,729 B1 | 3/2001 | Agraharam et al. | |
| 6,324,265 B1 | 11/2001 | Christie et al. | |
| 6,925,161 B2 * | 8/2005 | Burg et al. | 379/201.01 |
| 7,248,683 B2 * | 7/2007 | Burg et al. | 379/201.01 |
| 7,526,077 B2 * | 4/2009 | Burg et al. | 379/201.01 |
| 2001/0049736 A1 | 12/2001 | Gibson et al. | |

OTHER PUBLICATIONS

EPO Search Report for EP 03 10 0353, May 21, 2003, 2 pages.

\* cited by examiner

*Primary Examiner*—Harry S Hong

(57) ABSTRACT

One or more elements in a telecommunications network (10, 10' and 10") receive a call hold-initiating message when a first party places a second party to the call on hold, and in doing so, triggers a call hold event in the network. In response to the call hold-initiating message, the network element may take one or more actions, including releasing one or more network resources and/or providing a service to the second party during the period the call remains on hold. Upon resumption of the call, the network will re-acquire the resources that had been previously released.

20 Claims, 4 Drawing Sheets

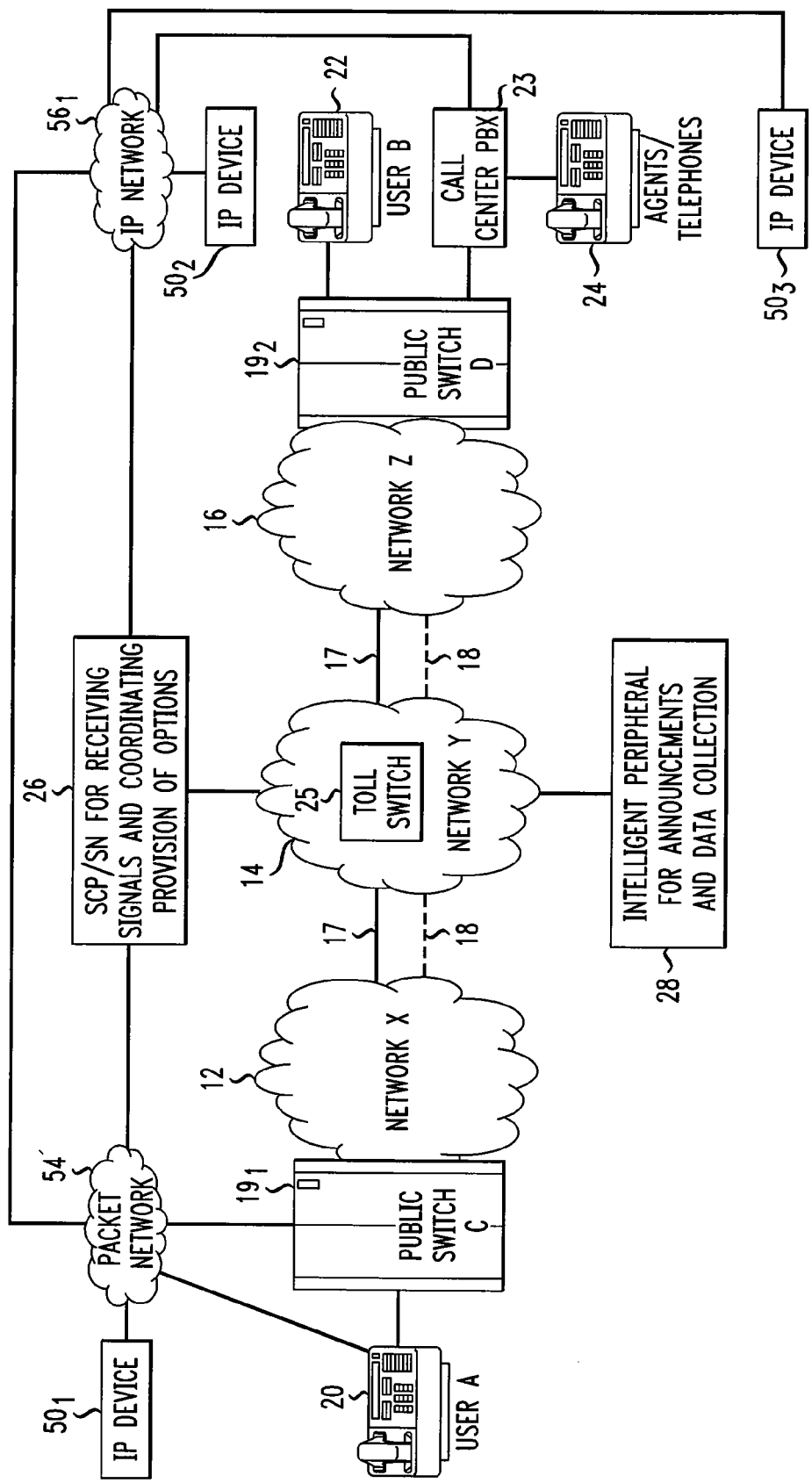

CALL HOLD SIGNALING

CROSS-REFERENCE TO RELATED APPLICATIONS

This application is a continuation of and claims priority to co-pending U.S. patent application Ser. No. 11/781,643, filed Jul. 23, 2007, which will issue as U.S. Pat. No. 7,526,077, which is a continuation of U.S. patent application Ser. No. 11/184,126, filed Jul. 19, 2005, which issued as U.S. Pat. No. 7,248,683 on Jul. 24, 2007, which is a continuation of U.S. patent application Ser. No. 10/078,685, filed Feb. 19, 2002, which issued as U.S. Pat. No. 6,925,161 on Aug. 2, 2005. The aforementioned related patent applications are all herein incorporated by reference.

TECHNICAL FIELD

This invention relates to a technique for propagating signaling information within a telecommunications network.

BACKGROUND ART

Technical advances in the development of telecommunications networks allow telephone subscribers to enjoy a variety of telecommunications services. For example, subscribers may now subscribe to a call hold feature whereby one party to a call can temporarily place that call on hold to accept another call. To activate this service, the party seeking to place the call on hold (hereinafter, the "holding party") does so by signaling an Ingress network switch, typically by actuating the switch hook on the telephone set.

Many business and other entities that receive large volumes of calls via one or more local or a toll-free numbers employ a private branch exchange (PBX) often in concert with an automatic call director to enable queuing of incoming calls for answer by an available agent. Upon answering the call, the attendant may need to place the calling party on hold to access a record or consult with a supervisor. After performing the required task, the attendant will then return to the call.

Currently, no mechanism exists for alerting network element(s) of a call being placed on hold. Thus, telecommunications carriers lack the ability to offer the party on hold (hereinafter, the "held party") a service of interest during the hold period. The absence of any mechanism for alerting network elements of the call being placed on hold incurs another disadvantage. Typically, a telecommunications carrier will typically commit certain resources within its network in order to complete a call between the calling and called party. Usually, such resources remain committed for the duration of the call and only upon call completion do such resources become available for other calls. Thus, such resources remain committed even during the interval in which a call remains on hold. Unfortunately, there currently exists no mechanism for enabling such network resources to know when a call has been placed on hold to allow their release and re-use during the hold period.

Thus, there is a need for a technique for propagating a signal among elements within a telecommunications network to alert each element when a call is placed on hold.

BRIEF SUMMARY OF THE INVENTION

Briefly, in accordance with a preferred embodiment, the present invention provides signaling within a telecommunications network for alerting one or more network elements when the holding party has placed a call on hold and when that party has taken the call off hold. Such signaling allows the network to re-use network resources during the period the call is on hold, as well as the ability to offer one or more services to the held party during the interval the call is held. The method commences upon the receipt in the network of a call hold event responsive to the holding party placing the call on hold. The call hold event may take the form of a switch hook or other signal from the holding party to signal the network that it should place the call on hold. Alternatively, the call hold event may comprise a signal from a piece of customer premises equipment (e.g., a Private Branch Exchange) that has itself placed the call on hold. In response to detecting a call hold event, the network generates a call hold-initiating message propagated to at least one network element. In response, the element receiving the call hold-initiating message takes one or more actions while the call is on hold. The action taken by the network element may include releasing a resource from the call on hold. Alternatively, or in addition to releasing the resource, the network element, upon receiving the call hold-initiating message, may prompt the held party to select one or more services while the call is on hold. Once the holding party has returned to the call, the resources needed for the call are reconnected and the service offered to the held party is terminated.

BRIEF SUMMARY OF THE DRAWINGS

FIG. 4 depicts a block schematic diagram of a third embodiment of a network architecture for propagating signaling information indicative of a call hold event to one or more network elements in accordance with the invention.

DETAILED DESCRIPTION

Figure 1:
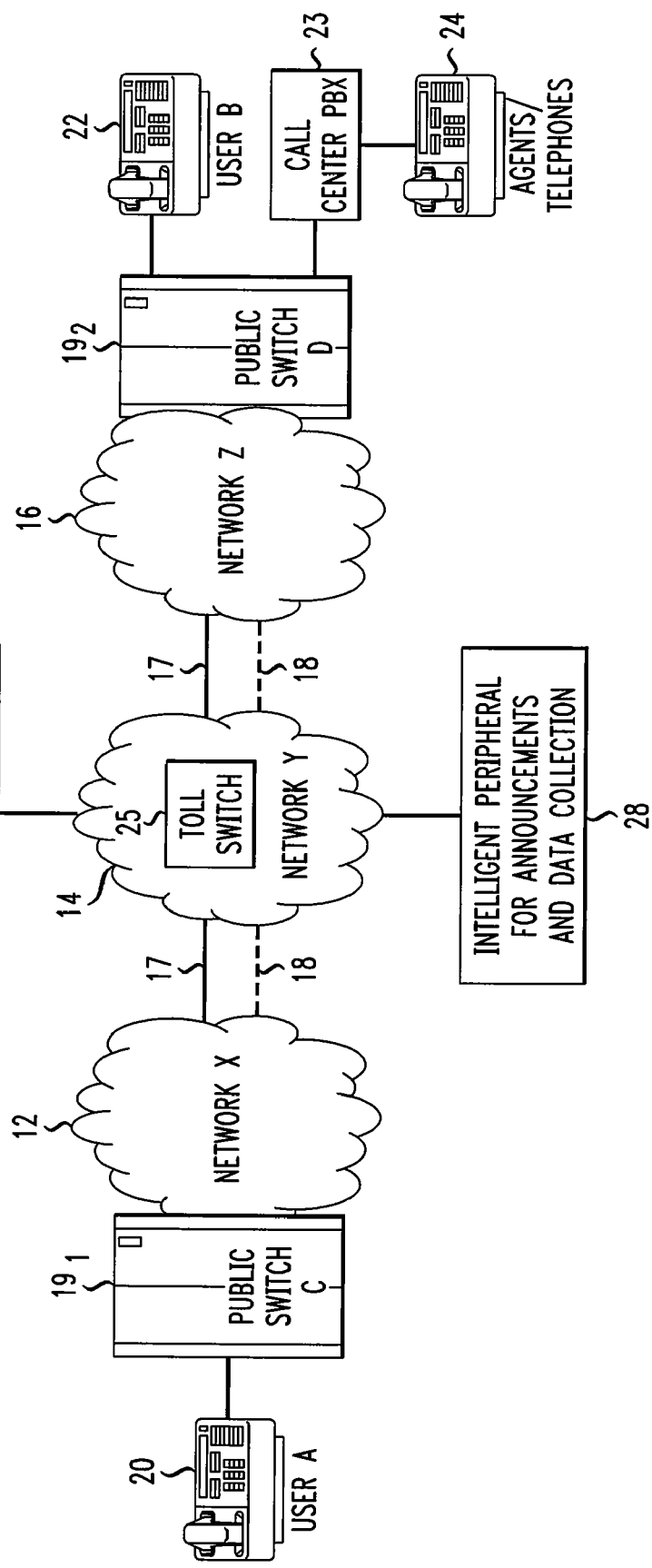
FIG. 1 depicts a block schematic diagram of a first embodiment of a telecommunication network architecture for propagating signaling information indicative of a call hold event to one or more network elements in accordance with the invention.

FIG. 1 depicts a block schematic diagram of a first embodiment of a telecommunications network architecture 10 for propagating signaling information to one or more network elements of a call hold event in accordance with the invention. A call hold event occurs in response to a holding party placing a call on hold. In the illustrated embodiment of FIG. 1, the network architecture 10 takes the form of a Public Switched Telephone Network (PSTN) and includes three separate networks 12, 14, and 16 interconnected to each other by bearer and signaling paths 17 and 18, respectively. The networks 12 and 16 comprise Local Exchange Carrier (LEC) networks that provide local telephony service (dial tone) to subscribers. As shown in FIG. 1, the LEC network 12 includes a public switch 19, that provides local telephone service to an individual subscriber 20. In a similar manner, the LEC network 16 includes a public switch $19_2$ that serves an individual subscriber 22 as well as a call center PBX 23 coupled to which is at least one, and typically, a plurality of agents 24 (only one of which is shown). Note that each of the public switches $19_1$ and $19_2$ could each serve a plurality of individual subscribers and call center PBXs.

The network 14 connects the LEC networks and serves to route calls between them. For that reason, the network 14 typically bears the designation of an Inter-Exchange Carrier (IXC) network and is best exemplified by the AT&T IXC network. Situated within the IXC network 14 is at least one toll switch 25 for routing a call received from one of the LEC networks 12 and 16 that is destined for the other LEC network. Typically the network 14 may include a plurality of interconnected toll switches. In addition to the toll switch(es) 25, the IXC network 14 also includes at least one Service Control Point/Service Node (SCP/SN) 26 that generally takes the form of a database containing instructions for the toll switch(es) for handing calls that requiring special treatment. Also, the IXC network 14 includes at least one Intelligent Peripheral device ($IP_e$) 28 that serves to collect digits and/or provide announcements in connection with providing various services. Although not shown, each of the LEC networks 12 and 16 may also include one or more intelligent peripherals.

Figure 2:
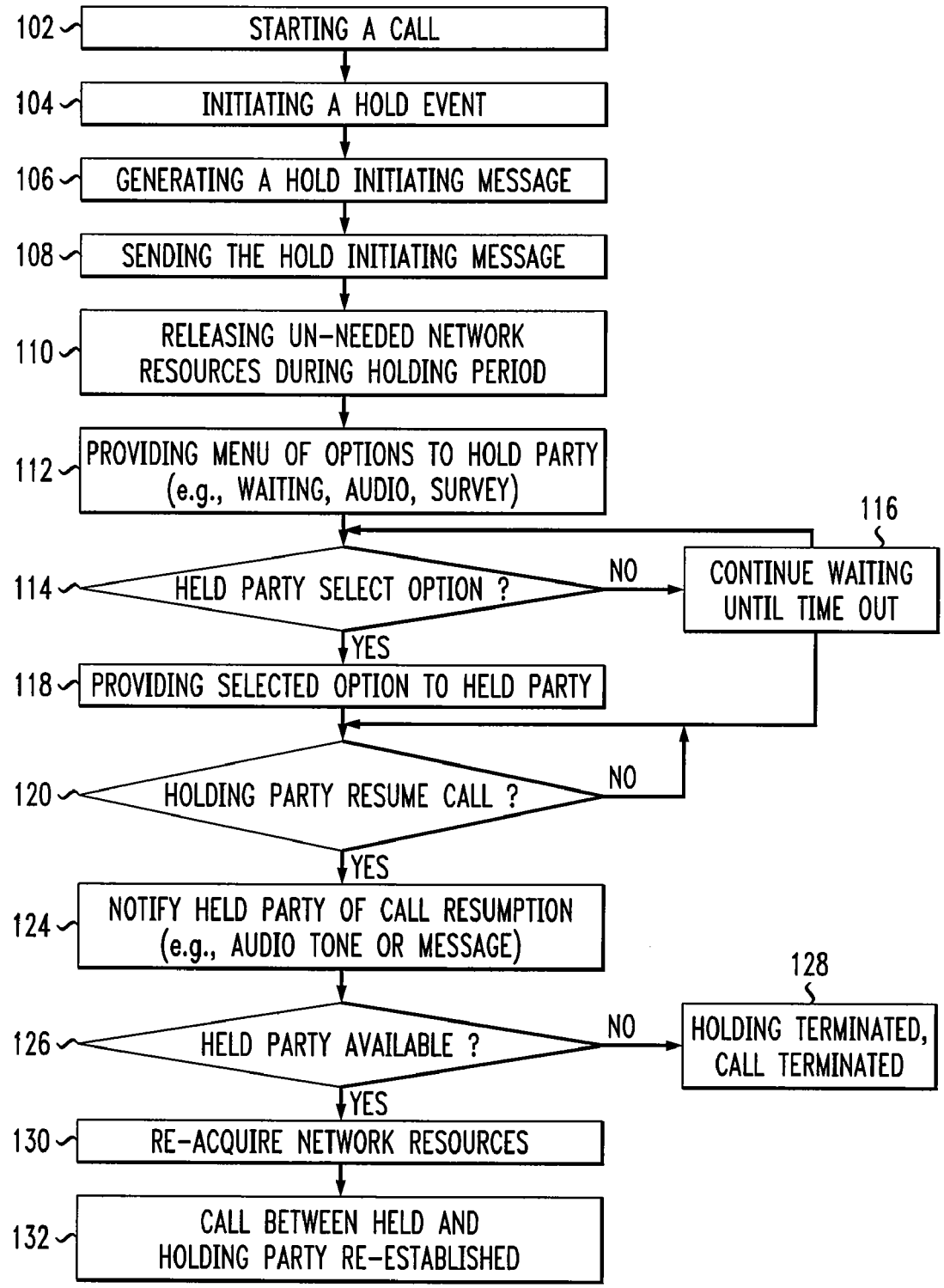
FIG. 2 depicts in flow chart form the steps associated with propagating signaling information in response to a call hold event and a call resumption event in the network of FIG. 1.

FIG. 2 illustrates in flow chart form the steps of the method of the invention for propagating signaling information to one or more network elements in the network architecture of FIG. 1 in response to a call hold event. Initially, a call starts within the network architecture 10 during Step 102 of FIG. 1 when a calling party, say subscriber 20 of FIG. 1 calls a called party, say subscriber 22 or the call center 23, both of FIG. 1. After call set-up, one party (i.e., the "holding party") may choose to place the other party on hold. To that end, the holding party initiates a call hold event (Step 104 of FIG. 2). An individual subscriber (e.g., one of subscribers 20 and 22) may place the other party on hold by signaling the subscriber's public switch (i.e., a corresponding one of public switches $19_1$ and $19_2$, respectively) to place the call on hold by sending a flash hook. A call center (e.g., call center PBX 23) may itself place the call on hold. Under such circumstances, the call center PBX 23 notifies its local switch (i.e., switch $19_2$) that the call center PBX has placed the call on hold typically via a PRI/Q.931 signal.

In response to a call hold event, the network architecture 10 of FIG. 1 generates a call hold-initiating message (step 106 of FIG. 2). In practice, the public switch that has placed the call on hold, or that serves a call center PBX 23 which itself has placed the call on hold, will generate the call hold-initiating message and will propagate that message, typically in the form of an SS7 signal, to one or more other elements via the signaling trunks 18 (e.g., an SS7 signaling trunk) of FIG. 1 during step 108 of FIG. 2. In response to the call hold-initiating message, the network element(s) receiving the message will take one or more actions. For example, in response to the call hold initiating message, one or more toll switches 25 in the IXC network 14 may release one or more resources from the call, such as $IP_e$ 28 of FIG. 1 during step 110 of FIG. 2. Other elements in one or both the LEC networks 12 and 16 could also release one or more resources in response to receipt of the call hold-initiating message.

In addition, or as an alternative to releasing resources, an element, such as the Intelligent Peripheral 28 that receives the call hold-initiating message may offer certain services (options) to the held party during step 112 of FIG. 2. For example, the held party could receive a menu of various audio messages during the holding period. Such messages could include news sources, stock quotes or even advertising or consumer surveys, which if listened to by the subscriber could afford a lower charge for the call or other benefit. After the offering the held party a menu of choices during step 112, a check is made during step 114 of FIG. 2 whether the subscriber has made a selection. Step 112 is continually re-executed until a time out interval is detected during step 116.

Assuming the held party has selected the desired service during step 114, then that party receives that service during step 118 of FIG. 2. With the network architecture of FIG. 1, the held party receives the service over a Plain Old Telephone Service (POTS) link. Note that the held party may finish receiving a first service before the holding party returns to the call. Under such circumstances, the held party could once receive the option to select another service, thus repeating step 118.

Following step 118 (or following the time out interval determined during step 116), a check is made whether the holding party has returned to the call during step 120. Upon returning to the call, the holding party initiates a call release event in a manner analogous as the call hold event. Thus, an individual subscriber will send a flash hook to the corresponding public switch to take the call off hold. The call center PBX that had previously placed the call on hold, upon taking the call off hold will notify the corresponding public switch of the call going off hold. Responsive to receipt of the call release event, the public switch serving the holding party generates a hold-releasing message for propagation to one or more other elements in the networks 12, 14, and 16. The return of the holding party to the call prompts a notification to the held party during step 124 of FIG. 2, whereupon a check is made on a repeated basis whether the held party is available during step 126. If, after a prescribed interval, the held party fails to become available, then a determination is made whether the current held party's action can be terminated. If not, then the original call (the call being held) should be terminated along with the call hold during step 128. If the held party's action can be terminated, then the hold is lifted, and network resources are re-acquired (step 130) whereupon the original call is resumed during step 132. Once the held party does become available, the resources need to resume the call are re-acquired, if previously released, and applied to the call during step 130 of FIG. 2. Upon resumption of a call, any network resources that had been previously released need to be recovered. To that end, a signal indicative of the resumption of the call now propagates through the networks. Such signaling may include an indication that this is a resumed call—as opposed to a new call—so that priority treatment is given to allocating the needed resources. Thereafter, the call between the holding party and the held party resumes during step 132.

Figure 3:
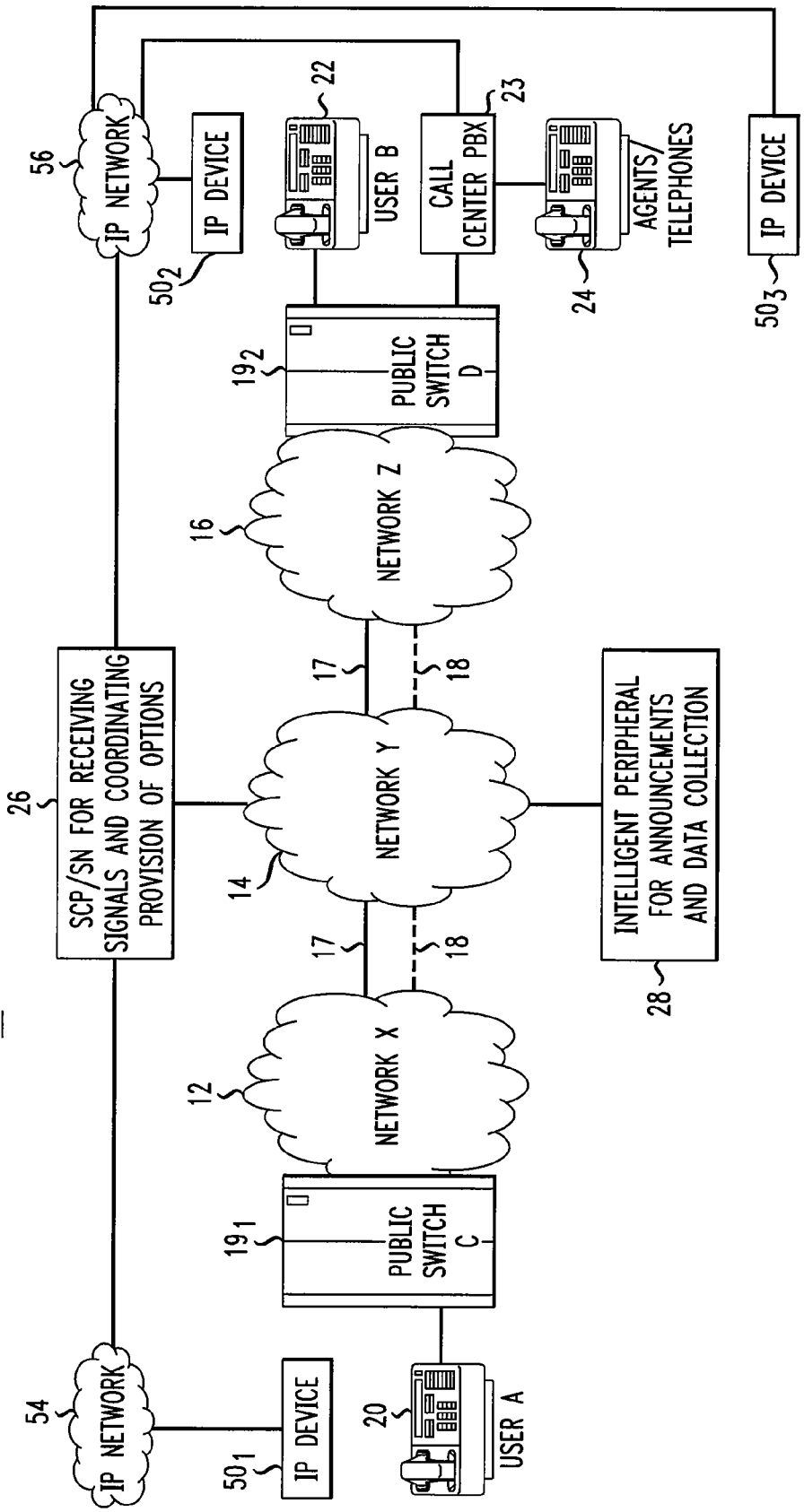
FIG. 3 depicts a block schematic diagram of a second embodiment of a telecommunication network architecture for propagating signaling information indicative of a call hold event to one or more network elements in accordance with the invention.

The call hold signaling method of the invention, although described above in connection with the Public Switched Telephone Network of FIG. 1 may also be practiced using a hybrid network which provides the subscribers with a data connection, and in particular, an IP connection. FIG. 3 shows such a hybrid telecommunications network architecture 10' that includes the PSTN elements of FIG. 1 shown in FIG. 3 with like reference numbers. The network architecture 10' includes a plurality of IP devices $50_1$, $50_2$ and $50_3$ typically, although necessarily, personal computers or the like, associated with the subscribers 20 and 22 and the agent 24, respectively. The IP device $50_1$ enjoys a connection to a first IP network 54 whereas the IP devices $50_2$ and $50_3$, along with the call center PBX 23, enjoy a connection to a second IP network 56. Both IP networks 54 and 56 have a link to the SCP/SN 26. Note that a single IP network (not shown) could serve all of the IP devices $50_1$-$50_3$, as well as the call center PBX 24 and the SCP/SN.

The hybrid network 10' of FIG. 3 advantageously allows the subscribers 20 and 22 and the agent 24 to receive a call hold notification as well as to offer one or more services in connection with the call hold event, via a corresponding one of the IP devices $50_1$, $50_2$ and $50_3$, respectively, when a party to the call has placed the subscriber/agent on hold. U.S. patent application Ser. No. 09/428,363 filed Oct. 27, 1999 and 09/801,562, filed Mar. 8, 2001, both assigned to AT&T, and both incorporated by reference herein, describe mechanisms for providing call event notification on an IP device in response to a call launched though one of the public switches 19$_1$ and 19$_2$ for delivery as a POTS (Plain Old Telephone Service) call to another public switch. Using such mechanisms, the SCP/SN 26, in response to a call hold event received in the network 14, would forward such a notification to the held party via an associated one of the IP networks 54 and 56 for delivery on a corresponding IP device. Additionally, the SCP/SN 26 could provide the held party via a corresponding IP device with a menu of services available to the held party during the call hold interval, including the services previously discussed in connection with step 118 as well as multimedia services, including providing the held party with video information. In response to the selection, the held party could receive the service on the IP device via an IP connection.

The network architecture 10' can also provide a call hold notification, as well as provide menu options to the held party for call launched as a Voice over Internet Protocol (VoIP) call from one of the IP devices for delivery to a subscriber/call center served by a public switch. Alternatively, the network architecture 10' of FIG. 3 can provide call hold notification and menu options to the held party where the call initiated from an IP device and terminated on an IP device with all communications through the IP network(s).

FIG. 4 depicts a second hybrid network architecture 10" that shares elements in common with the hybrid architecture 10' of FIG. 3 so like reference numbers depict like elements. With the hybrid network architecture 10" of FIG. 4, the subscriber 20 receives traditional service (POTS) from the public switch 19$_1$ at its Customer Premises Equipment and also receives always-on IP service via DSL or cable from packet network 54'. For example, today's technology allows a single Local loop to support a baseband PSTN line with lifeline capabilities, two DSL based packet voice connections that are connected to the public switch 19$_1$, for PSTN features, and a DSL connection. The call hold signal can be translated at the subscriber's CPE to IP on the DSL connection and be associated with any of the "PSTN" lines. This is an exemplary use of integrated PSTN/DSL technology. If the subscriber's CPE lacks this capability, then the subscriber would need a caller ID-like box, as discussed in U.S. patent application Ser. No. 09/801,562, incorporated by reference herein.

The foregoing describes a technique for propagating signaling information indicative of a call hold event and a call resumption event to one or more elements in a telecommunications network architecture.

The above-described embodiments merely illustrate the principles of the invention. Those skilled in the art may make various modifications and changes that will embody the principles of the invention and fall within the spirit and scope thereof.

What is claimed is:

1. An apparatus for propagating signaling information in a communications network to alert at least one element of a call hold event when a first party to a call with at least a second party places the call on hold, comprising:

means for receiving in the communications network a call hold event in response to the first party placing the call on hold;

means for generating a call hold-initiating signal in response to receipt of the call hold event and propagating said call hold-initiating signal to at least one network element; and means for checking whether the second party on hold is still available.

2. The apparatus of claim 1, further comprising:
means for taking an action while the call remains on hold.

3. The apparatus of claim 2, wherein the action taken comprises releasing at least one network resource associated with the call while the call remains on hold.

4. The apparatus of claim 3, further comprising:
means for re-acquiring the at least one network resource associated with the call once the first party returns to the call.

5. The apparatus of claim 4, further comprising:
means for affording priority treatment for re-acquisition of resources for a resumed call.

6. The apparatus of claim 2, wherein the action taken comprises providing a service to the second party while the second party remains on hold.

7. The apparatus of claim 6, wherein the action taken further comprises providing the second party a menu of service choices.

8. The apparatus of claim 7, wherein the service choices include at least one of: (a) receiving news, (b) receiving a stock quote, (c) receiving an advertising or consumer survey, or (d) receiving video information.

9. The apparatus of claim 8, wherein the second party receives a benefit for listening to the advertising or responding to the consumer survey.

10. The apparatus of claim 9, wherein the benefit received by the second party comprises a lower charge for the call.

11. The apparatus of claim 6, wherein the second party receives the service over a Plain Old Telephone Service (POTS) link.

12. The apparatus of claim 6, wherein the second party receives the service on an Internet Protocol device over an Internet Protocol link.

13. The apparatus of claim 1, wherein the call hold event is received in the communications network from an Internet Protocol device in connection with a Voice over Internet Protocol (VoIP) call originated from the first party.

14. The apparatus of claim 13, wherein the call hold-initiating signal is an SS7 signal generated in accordance with the call hold event received from the Internet Protocol device.

15. An apparatus for propagating signaling information in a communications network to alert at least one element of a call hold event when a first party to a call with at least a second party places the call on hold, comprising:

means for receiving in the communications network a call hold event in response to the first party placing the call on hold;

means for generating a call hold-initiating signal in response to receipt of the call hold event and propagating the call hold-initiating signal to at least one network element;

means for checking whether the second party on hold is still available;

means for taking a first action while the call remains on hold;

means for receiving a call resumption-event in response to a first party taking the call off hold;

means for generating a call resumption-initiating signal in response to receipt of the call resumption event and propagating the call resumption-initiating signal to at least one network element; and means for taking a second action once the call is taken off hold.

16. The apparatus of claim 15, wherein the first action taken comprises releasing at least one network resource associated with the call while the call remains on hold.

17. The apparatus of claim 16, wherein the second action taken comprises re-acquiring the at least one network resource associated with the call once the first party has taken the call off hold.

18. The apparatus of claim 15, wherein the first action taken comprises providing a service to the second party while the second party remains on hold.

19. The apparatus of claim 18, wherein the first action of providing a service comprises providing the second party a menu of service choices.

20. A method for propagating signaling information in a communications network to alert at least one element of a call hold event when a first party to a telephone call with at least a second party places the call on hold, comprising:

receiving in the communications network a call hold event in response to the first party placing the telephone call on hold;

generating, via a switch in the communications network, a call hold-initiating signal in response to receipt of the call hold event and propagating the call hold-initiating signal to at least one network element; and checking whether the second party on hold is still available.

\* \* \* \* \*